US009460461B1

(12) United States Patent
Gill et al.

(10) Patent No.: US 9,460,461 B1
(45) Date of Patent: Oct. 4, 2016

(54) SYSTEM FOR COLLECTING AND EXPOSING USAGE METRICS ASSOCIATED WITH MOBILE DEVICE APPLICATIONS

(75) Inventors: Sunbir Gill, Irvine, CA (US); Matthew A. Jones, Ladera Ranch, CA (US); Mekka C. Okereke, Irvine, CA (US); Ameesh Paleja, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 621 days.

(21) Appl. No.: 13/044,475

(22) Filed: Mar. 9, 2011

(51) Int. Cl.
G06Q 30/00 (2012.01)
G06F 17/30 (2006.01)
G06Q 30/06 (2012.01)

(52) U.S. Cl.
CPC ...... *G06Q 30/0623* (2013.01); *G06Q 30/0641* (2013.01)

(58) Field of Classification Search
CPC .................. G06Q 30/0623; G06Q 30/0641
USPC ................................. 705/26.1–27.2
See application file for complete search history.

(56) References Cited

U.S. PATENT DOCUMENTS

| 5,892,900 | A | * | 4/1999 | Ginter | G06F 21/10 726/26 |
| 8,255,280 | B1 | * | 8/2012 | Kay | G06F 21/53 705/26.1 |
| 2002/0165802 | A1 | * | 11/2002 | Harrison et al. | 705/27 |
| 2008/0092107 | A1 | * | 4/2008 | McWilliam | G06F 8/20 717/101 |
| 2009/0275320 | A1 | * | 11/2009 | Marshall | 455/418 |
| 2011/0258301 | A1 | * | 10/2011 | McCormick et al. | 709/222 |
| 2011/0320307 | A1 | * | 12/2011 | Mehta et al. | 705/26.7 |

OTHER PUBLICATIONS

Polilli, S. (1994). Novell and IBM meter software with add-ons. InfoWorld, 16(20), 39. Retrieved from http://search.proquest.com/docview/194281019?accountid=14753.*

* cited by examiner

*Primary Examiner* — Kathleen Palavecino
(74) *Attorney, Agent, or Firm* — Knobbe, Martens, Olson & Bear, LLP (57) ABSTRACT

Metrics data is generated and gathered based on users' use of mobile device applications. The metrics data may be cached by a mobile app store client on the users' mobile devices before being transmitted to a network application system which may be associated with an electronic catalog through which users can download mobile applications. The network application system may store user metrics information, aggregate that information, and perform analysis of the information. Resulting data may be displayed to users visiting product detail pages for mobile applications. The system may also generate reports to application developers based on how the users of their applications are interacting with the applications.

15 Claims, 6 Drawing Sheets

Fig. 1.

ELECTRONIC CATALOG – ANGRY SQUIRRELS - DETAILS
FILE  EDIT  VIEW  FAVORITES  TOOLS  HELP

BACK  FORWARD  STOP  REFRESH  HOME  SEARCH  FAVORITES  HISTORY  MAIL  SIZE  PRINT

LINKS >> | ADDRESS | HTTP://WWW.ELECTRONIC-CATALOG.COM/ANGRY-SQUIRRELS.HTML | ▼ | GO

Angry Squirrels — 201
Application – by Radical Mobile — 202    *version: 1.03*
204    Price: $1.99 — 203    205

Description: A group of evil mongooses have stolen some squirrels' nuts – and those squirrels are angry! Help the squirrels retrieve their nuts in 35 levels!

222 — Purchase For:
Tom's Work Cell    Add to Cart — 223

Application Ranking by Purchases: — 210
  #5 in Applications
  #2 in Appliactions > Games Application Ranking by Times Launched: — 211
  #2 in Applications
  #1 in Applications > Games Application Ranking by Time Spent: — 212
  #3 in Applications
  #3 in Applications > Games 231 —
*High Scores*
| All Time | This Week | Today |
|---|---|---|
| Bob  13947 | Jill   13251 | You  7581 |
| Jill  13251 | Caesar 9982 | Kim  7311 |
| ... | ... | ... |
| You  7581 | You  7581 | |

232 —
Game-Play Statistics
Average Time to Beat Game: 5.3 hours
...

233 —
*Most Used Downloadable Content:*
1 Most Used: Squirrels Map Pack 1
2 Most Used: Squirrels Antarctic Pack

*Most Used Related Applications:*
Angry Squirrels HD (#8 in Applications)

SYSTEM FOR COLLECTING AND EXPOSING USAGE METRICS ASSOCIATED WITH MOBILE DEVICE APPLICATIONS

BACKGROUND

Mobile device users often download applications through mobile application stores, or "app stores." Such app stores may be an accessed through a store client application installed on a user's mobile device or through another network resource, such as a webpage accessible from a mobile device or general purpose computer. Application store owners have an incentive to attract continued visits from users, for example so the application store may present users with additional purchase options.

Many mobile device applications include a variety of metrics based on things such as in-game accomplishments. Taking a game as an example of a mobile device application, the game's user might achieve high scores, earn achievements, obtain unlockable in-game items, gain levels for an in-game character, or make other progress within the game which the game may track as various types of metrics. A mobile game's developer may provide a website which displays users' in-game metrics, such as those described above, so that users can compare and compete against each other. However, this requires additional effort from a game developer and continued hosting of the website. Furthermore, users might not be aware of the website because different game developer likely host separate websites displaying metrics for only their games. A user who uses a number of different mobile applications may thus need to visit a variety of different websites in order to compare his in-game progress against others.

As a related problem, mobile applications are often inefficient in that they fail to capture valuable data concerning how users actually use them. A mobile application's developer may invest significant resources into creating a new mobile application and may release that application for downloadable sale only to find that sales are short-lived. The developer may be faced with little information other than sales numbers and occasional user reviews. Such reviews may not reflect an accurate cross-section of the application's users, as they tend to be left by users who are sufficiently motivated to invest their own time in creating a review.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein.

DETAILED DESCRIPTION OF SPECIFIC EMBODIMENTS

Figure 1:
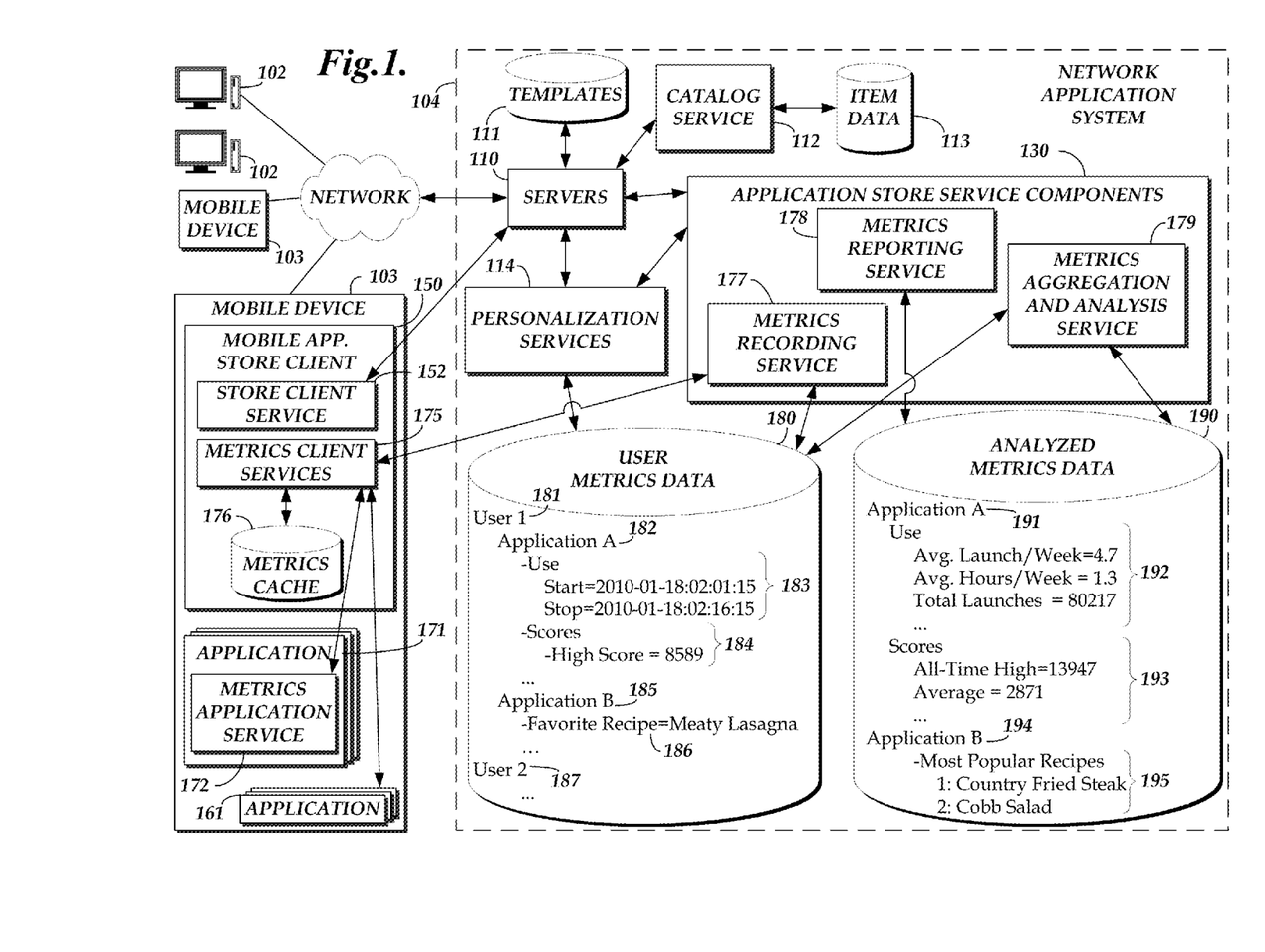
FIG. 1 depicts one embodiment of a system capable of gathering metrics of mobile device applications, personalizing an application store based on gathered metrics, and providing developers with reports based on aggregated metrics.

FIG. 1 shows an illustrative embodiment of a system for monitoring, gathering, aggregating, analyzing, and reporting metrics concerning the use of mobile device applications. In an example use scenario, a user has a mobile device 103 on which a mobile app store client 150 is installed. The mobile device 103 connects to a network application system 104, which may include app store provided by application store service components 130.

Figure 2:
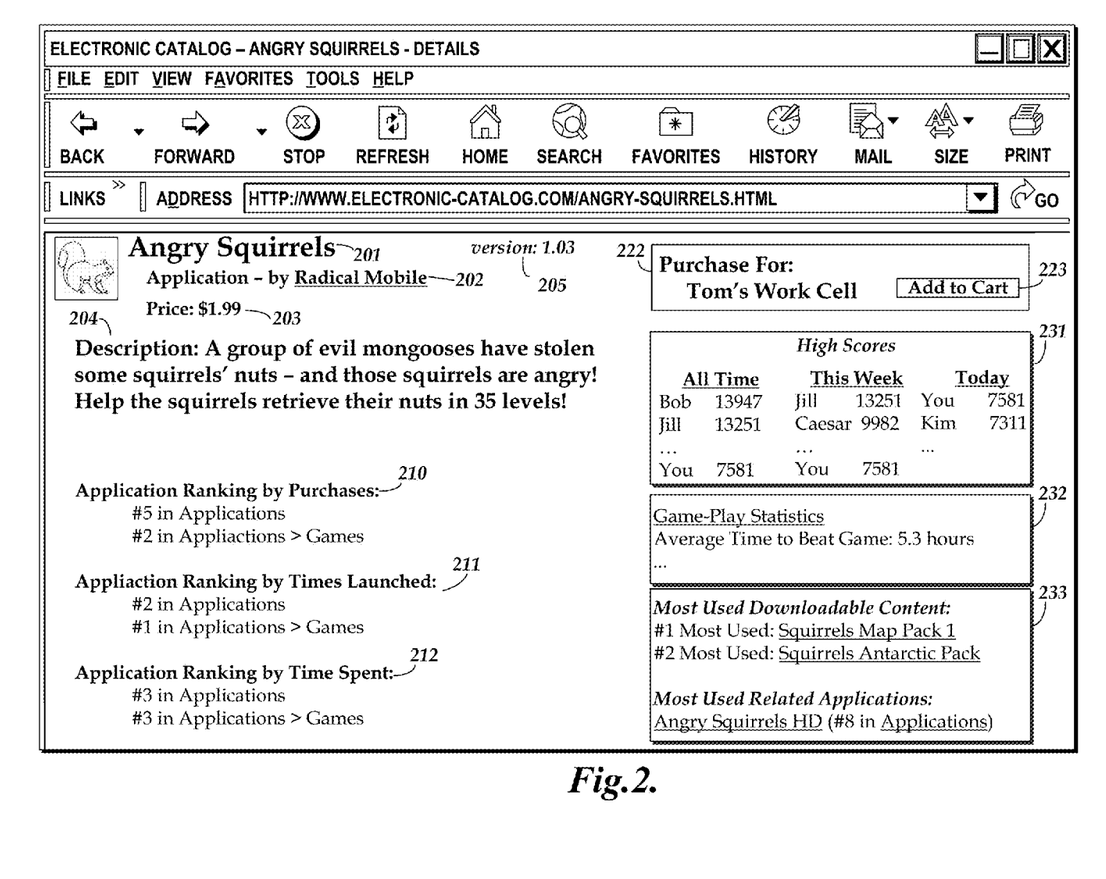
FIG. 2 illustrates one example of an interface through which a user may be presented with application metric information on a product detail page.
Figure 3:
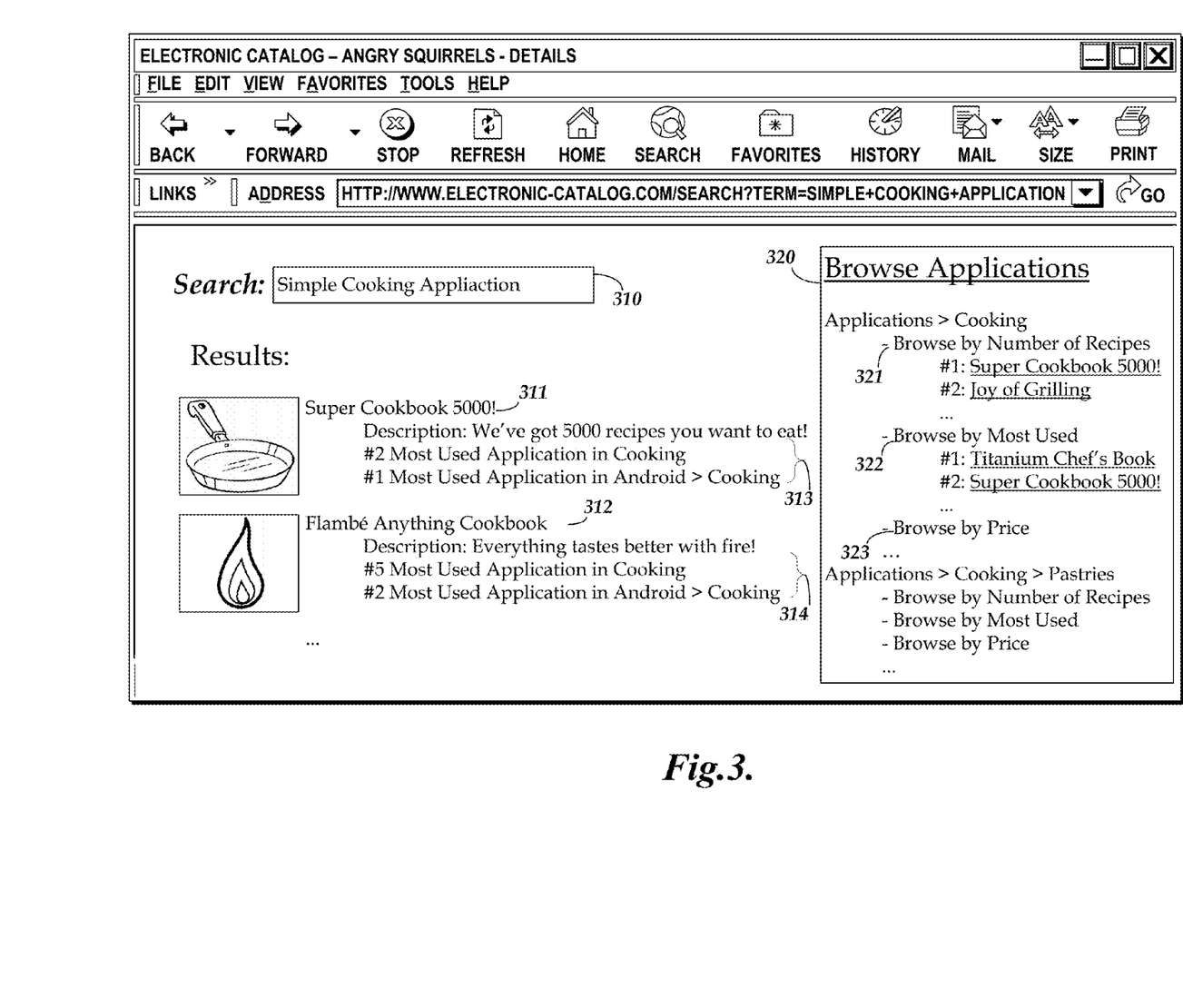
FIG. 3 shows one example of how a user may be presented with search results based at least in part on aggregated metric data.

The app store includes an electronic catalog that comprises product detail pages corresponding to particular applications. The app store may also include various search and navigation tools to assisting users in locating product detail pages of interest. The product detail page (or other network resource) for a given application typically includes a description of the application, user reviews and ratings of the application, and an option to select the application for purchase. In addition, the product detail page (and/or other pages of the electronic catalog) may display application-specific metrics collected by the system 104. Examples of detail pages that display associated metrics are shown in FIGS. 2 and 3, which are discussed below.

The metrics presented by the system 104 (on the associated product detail page or elsewhere) can provide a variety of information about the use of a mobile device application, such as statistics, facts, and/or descriptions of use. Metrics are collected automatically and are not explicitly provided. Some examples include usefulness metrics 192 which provide information concerning how often the mobile device application is used by its users. The usefulness metrics may include, for example, the average number of times users launch the application, the average amount of time a user spends using the application, the total number of times all users have launched the application, or some other metric. Some metrics may relate to one or more time periods and/or intervals, such as the average number of times users launched the application per day during specific windows of time (e.g., weeks or months). Considering mobile device game applications as another example, the metrics may include high-scores 193, achievements, and other items related to the use of a game application. As another example, mobile device cooking applications may have metrics concerning recipe popularity 195.

In the present example, the user purchases the mobile device application, which is then transferred to the user's mobile device 103. When the user uses the application, the mobile application store client 150 on the user's mobile device gathers data corresponding to one or more metrics of the user's use of the application. The mobile application store client may store the metrics data in a metrics cache on the mobile device 103 before eventually sending the metrics data to the network application system 104. In some embodiments or use cases, when the user revisits the mobile device application's product detail page, the network application system personalizes the page so that the user's own metrics are displayed for comparison against other users' metrics.

The system 104 aggregates and analyzes metrics data, and may store the results as analyzed metrics data 190. The system may also transmit the analyzed metrics data, or reports derived therefrom, to the developers of mobile device applications (see FIG. 4, discussed below). For example, the system may send the developer an email with metrics data. In the case of a game developer, the metrics data may reveal to the developer that users of the mobile device application spend most of their time playing in the game's multiplayer mode, and very little time in a single player mode. Such information may be useful to a developer for a variety of purposes, including designing additional content or versions of the application, designing new applications, and marketing applications to potential users.

The embodiment illustrated in FIG. 1 will now be described in greater detail by addressing particular components which may be used within the system. User systems 102, such as general purpose computers, access the network application system 104 through the network and communicate with servers 110 within the network application system 104. In one embodiment, the servers 110 include web servers which provide network resources to the user systems 102. For example, such network resources may include web pages providing users access to an electronic catalog through which they can purchase items, including mobile applications. The electronic catalog may additionally or alternatively allow users to rent or lease items, such as music or movies, bid on auction items, and perform various other types of catalog-related tasks. The servers 110 are in communication with a catalog service 112 which provides information concerning items available through the electronic catalog. Such information may be stored in a database for item data 113, and may include, for example, item descriptions, item prices, item specifications, item availability, the identity of an item's author, manufacturer, developer, or publisher, and/or other information relevant to such items. Items offered by the network application system 104 and represented by the item data 113 may include applications designed for use with mobile devices.

The applications may include a variety of types and packages of code executable on or accessible from a mobile device, such as programs which may be installed and/or run on a mobile device, applets, applications designed to be accessed through network browsers (such as web-based HTML5 or Flash applications). Such applications can be created using a variety of programming languages, such as Java, Javascript, HTML, XML, CSS, Ruby, C, C++, C#, Visual Basic, Pascal, Object Pascal, ActionScript, XHTML, WML, and any combination thereof. In some embodiments, the applications are categorized according to general functionality, such as navigation, games, multimedia, other entertainment, system utilities, communication, social networking, travel, etc.

A user of a user system 102 may request from a server 110 to view an application's information. In this embodiment, the server 110 queries the catalog service 112 which retrieves item data 113 related to the application. The server 110 is also in communication with templates data 111 which provides predefined formats for presenting item data to users. The server formats the retrieved item data according to at least one selected template and transmits the resource to the user system 102.

The servers 110 may also provide metrics data related to an application. For example, the server 110 may incorporate metrics data onto a product detail page provided to a user. This metrics data may provide a measure of the application's usefulness, as determined by the system's aggregation and analysis of multiple users' metrics data. The server may communicate with application store service components 130 in order to obtain such metrics data. In the illustrated embodiment, the system stores this usefulness metrics data as analyzed metrics data 190.

In some embodiments, mobile devices 103 are a particular type of user system 102. Mobile devices 103 may include mobile phones, tablets, slate computers, netbooks, laptops, personal digital assistants and/or any of a number of other categories of electronic devices that are capable of running applications.

The network application system 104 may include the ability to provide personalized information to different users, user systems 102, and/or mobile devices 103. Such personalization may be performed by personalization services 114 and/or other servers 110. Examples of personalization include personalized recommendations, personalized search results, personalized browsing of the applications available through the network application system 104, and personalized metrics data presented on product pages. Personalization for a user may be based on metrics data associated with a preexisting account of the user with the app store.

In the embodiment shown in FIG. 1, the network application system 104 obtains metrics data from mobile application store clients 150 installed on users' mobile devices 103. A mobile application store client 150 may include metrics client services 175 which perform a number of tasks. These tasks include gathering metrics data based on the use of mobile device applications 161, 171 on the mobile device 103, storing gathered metrics data in a metrics cache 176 on the mobile device, and transmitting the stored metrics data to the network application system 104 when possible and/or appropriate. In another embodiment, mobile device applications 161, 171 or components thereof 172 may report metrics data to the network application system 104 without the use of a mobile application store client 150.

The metrics client services 175 may obtain metrics data in one or more of variety of possible ways. In the present embodiment, metrics client services 175 may obtain metrics data for a mobile device application 161 running on the mobile device 103, without that mobile device application 161 being designed or configured to provide metrics data. For example, the metrics client services 175 may determine when a particular mobile device application 161 begins and/or ends operation on the mobile device 103. The metrics client services 175 may perform this determination by monitoring a list of applications running on the mobile device 103, querying the mobile device's operating system or available libraries, or otherwise observing operation of the mobile device application 161 without interacting with it. Metrics client services 175 may determine a mobile device application's resource metrics, such as processor usage and/or memory usage, based on similar interactions with the mobile device's operating system and/or libraries, without necessarily needing to interact with the mobile device application 161 itself. In another embodiment, the mobile client services query the mobile device application 161, which may provide information relevant to metrics without the mobile device application 161 needing be designed or configured to provide metrics data.

In some embodiments, metrics client services 175 may obtain metrics data from a metrics application service 172 component of an application 171. A metrics application service 172 may be provided within an application 171 by the application's developer. For example, the developer may include within the mobile device application 171 an application programming interface ("API"). This API may implement a standard interface through which mobile client services 175 may interact with the application 171 in order to obtain metrics data. A developer may use a software development kit ("SDK") designed for the development of mobile device applications, and/or a particular mobile device operating system or other software environment. The SDK may allow a developer to implement a metrics application service 172 within an application 171, and may therefore be considered to be a metrics-enabled SDK.

In one embodiment of a metrics-enabled SDK, an application's metrics application service 172 may or must implement different services based on one or more application categories associated with the application being developed using the SDK. For example, an application associated with a "game" category may be allowed or required to provide a score reporting service, such as providing a "getHighScore" API which allows a metrics client service 152 to request a high score from the game application. In another example, the game application may be allowed or required to provide a reporting service in which the application initiates an interaction rather than responds to a request. This could be provided through a "postHighScore" API which could transmit to a metrics client service 152. Alternatively or additionally, a metrics application service 172 may provide metrics data to a data store, such as a metrics cache 176 on the mobile device 103.

As another illustrative example, a metrics-enabled SDK may allow applications associated with a "cooking" category to implement services related to the number of recipes which the application contains, or the popularity of recipes. Alternatively, the metrics-enabled SDK may require that an application implement such services in order to be associated with the "cooking" category. Example cooking applications which implement these services could initiate and/or respond to transfers of cooking metrics data. This could provide a uniform way of obtaining cooking metrics data from different cooking applications, operational on a number of mobile devices 103. The network application system 104 could then store, aggregate, and analyze the cooking metrics data. The system may provide users of an electronic catalog with a convenient way to compare cooking metrics data between cooking applications. For example, the system might present a user with cooking metrics related to recipe popularity. As a result, the user may select a particular cooking application based on data that shows other users frequently rely on the application for Italian recipes.

In another embodiment, metrics and/or the functionality which allows metrics data to be gathered, is supplied at least in part by a developer. For example, a developer may want users visiting his application's detail page to see a scoreboard for which users have earned the most "golden widgets" within his application. The network application system might not have any existing metrics infrastructure related specifically to golden widgets, but the system may provide the developer with the ability to define how metrics data related to golden widgets is obtained from his application, and/or how the metrics data should be presented to users on the application's product details page. Some embodiments may use markup languages, such as Extensible Markup Language ("XML") to transmit and/or store metrics data. In such an embodiment, a developer may be presented with the ability to define an XML tag associated with a metric so that metric data encoded with that tag is associated by the system with that metric. The metric data may be provided by Really Simple Syndication ("RSS"), which may use XML tag to identify which data within the RSS feed relates to that particular metric. Other implementations for providing developers with the ability to supply and/or define metrics may also be used.

Some of the descried embodiments include metrics application services 172 which interact with metrics client services 175. However, in another embodiment, a metrics application service 172 is configured to communicate with a network application system 104 without the use of metrics client services 175. For example, an application's metrics application service 172 may transmit a TCP/IP packet containing metrics data to a metrics recording service 177 located within a network application system 104.

In other embodiments, an application includes a metrics application service which is added after the application is submitted to the app store by the developer. For example, the network application system and/or the mobile application store client may add code to the application 171. Such code may include a library of code, such as a shared library, a static-link library, a dynamic-link library ("DLL"), or the like. In one embodiment, adding the code can include injecting the code into the application 171, so that the modified application 171 includes a metrics application service. For example, an application may implement certain predefined functions related to the initialization, starting, stopping, pausing, resuming, and/or destruction of an instance of that application. A service, such as an application store service component 130, may identify where within an application binary one or more of these predefined functions is implemented, and may then inject code causing the application to report metrics events when performing one of these predefined functions. The resulting application may then report metric data, relevant to usefulness metrics such as when an application is started and stopped, to metrics client services 175.

For example, the Android™ operating system currently requires most applications to implement an "android.app.Activity" class, which may require implementation of functions such as: onCreate( ), onStart( ), onResume( ), onPause( ), onStop( ), onRestart( ), and onDestropy( ) In one embodiment, the system injects code into an application binary so that one or more of those Activity functions transmit metric data. When a mobile application runs the resulting binary with injected code, the mobile device's metrics client services receives metric data from a metric application service implemented by the injected code. This is one example of a way in which the system may obtain usefulness metric data for an application, even if the application's developer did not design the application to provide metric data.

In the embodiment shown in FIG. 1, the metrics client services 175 may store metrics data in a metrics cache 176 located on the mobile device 103 before transmitting the metrics data to the network application system 104. As will be discussed in greater detail in the context of FIG. 6, the amount of time during which the metrics data is stored in the metrics cache may depend at least in part on the ability of the metrics client service to connect to the network application system 104. Some user devices experience periods during which they lack network connectivity, so caching metrics data locally on the mobile device 103 may allow the metrics data to reach the system 104 once sufficient connectivity exists. In one embodiment, a limited amount of metrics data is cached, or metrics data is cached for a limited amount of time. In another embodiment, metrics data is encrypted when cached and/or when transmitted, for example to ensure the accuracy of the metrics data. Such encryption may be used to prevent individuals from tampering with metrics data, for example to avoid a user "cheating" by causing his mobile device to report a high score that he did not actually earn.

The application store service components 130 of the system 104 may store the metrics data in any of a variety of formats. In FIG. 1, metrics data is stored as both user metrics data 180 and analyzed metrics data 190. In this embodiment, a metrics recording service 177 receives metrics data from a mobile device 103 and stores that metrics data in a data storage system for user metrics data 180. The user metrics data may be organized, for example, according to the users which it is associated with 181, 187, the applications which it is associated with 182, 185, the metric categories which it is associated with 183, 184, 186, and/or any combination thereof. A metrics aggregation and analysis service 179 may perform aggregation and analysis of metric data, for example the user metric data 180. The results of such aggregation and analysis may be stored as analyzed metrics data 190. A metrics reporting service 178 may generate and transmit metrics reports based on metrics data, such as analyzed metrics data 190. In some embodiments, metrics data is associated with a specific version of a specific application.

Looking more closely at the metrics data in FIG. 1 as an example, data is gathered from both applications having metrics application services 171 and applications without such services 161. The information is obtained by the metrics client services located on various mobile devices 103, and may be stored on the respective mobile device's metrics caches before being transmitted to the system's metrics recording service 177. The metrics recording system 177 has stored metrics data associated with a user identified as "User 1" 181, for applications identified as "Application A" 182 and "Application B" 185. Application A is a game and has score-related metrics data associated with it 184. The user metrics data 180 also stores use data 183 associated with User 1 and Application A. For example, there is a recorded metric that User 1 started running Application A at 2:01:15 on Jan. 18, 2010. A similar metric reveals that User 1 stopped running Application A at 2:16:15 on Jan. 18, 2010.

The user metrics data 180 of FIG. 1 reveals that a metric has been recorded indicating that User 1's favorite recipe in Application B is "Meaty Lasagna" 186. In one embodiment, Application B may have reported this metric as "Meaty Lasagna." In another embodiment, Application B may have reported metric data corresponding to each time a user viewed a recipe in Application B and the mobile app store client and/or an application store service component may have aggregated and analyzed the metric data corresponding to individual recipe views in order to generate metric data corresponding to User 1's favorite recipe.

The metrics aggregation and analysis service 179 has performed some aggregation and analysis of user metrics data 180 and transmitted resulting analyzed metrics data for storage 190. For example, the analyzed metrics data 190 is stores which reveals that users of Application A launch Application A an average of 4.7 times per week, spend an average of 1.3 hours per week in Application A, and have launched Application A 80217 times in total 192. The average launch time per week metric may have been generated by the metrics aggregation and analysis service counting the number of "Start" entries in the user metrics data 182 (obtaining the "Total Launches" metric in the process) and dividing the total number of "Start" entries by the number of weeks which those entries span. Similarly, the analyzed metrics data 190 stores data indicating that the all-time high score for Application A is 13947, which may have been determined by the metrics aggregation and analysis service performing a search of user metrics data 180 for the highest score associated with Application A. The analyzed metrics data 190 may also include data associated with user identities, such as identifying the user who achieved the all-time high score.

Although the embodiment disclosed in FIG. 1 shows network various components as residing within a single network application system, in other embodiments the components are further distributed and may be performed or provided by multiple systems in communication with each other. Furthermore, any individual component, such as a data component 111, 113, 176, 180, 190, may be provided by a distributed storage system, a virtualized storage system, and/or a cloud-based storage system. In another embodiment, the network application system acts as an application portal which aggregates applications hosted on other systems and offers users a unified way of browsing, reviewing, downloading, and/or running the applications.

Referring to FIG. 2, an example of a user interface is shown in which the user is shown metric information based on his and other users' use of mobile device applications. In this embodiment, the user may be viewing a network resource provided by the network application system's server 110, based on information provided by personalization services 114. FIG. 3 shows a detail page view for a particular (fictitious) mobile application, Angry Squirrels 201. The detail page may provide a variety of information about the application, including a detailed description 204, the application's current version number 205, its developer 202 and its price 203. The detail page also provides the user with the ability to purchase the application 222 by adding it to the user's cart 223. The system provides the user with information concerning the application's popularity in a multiple categories, based on a variety of popularity measurements. According to purchase-based popularity, Angry Squirrels is reported as being the fifth most popular application that the app store offers and the second most popular game that the app store offers 210. According to launch-based popularity, Angry Squirrels is reported as being the second most popular application that the app store offers and the most popular game that the app store offers 211. According to time-based popularity, Angry Squirrels is reported as being the third most popular application that the app store offers, and the third most popular game that the app store offers 212.

In another embodiment, the system may provide information to a user, such as through personalizing an app store page, based on metrics derived from other metrics, product details, and/or a combination thereof. For example, applications could be ranked according to a calculated value metric, where the value metric is determined based on an application's price and the extent to which users use the application. The system may therefore be able to calculate and transmit information to further inform users in making value-based purchase decisions.

FIG. 2 reveals additional metric data, such as high scores metric data 231. Angry Squirrels' product detail page includes various high score trackers which show the highest scores earned in Angry Squirrels at any time, during the current week, and during the current day 231. The system may present such information in order to attract repeated visits by users, even when such users already have the application shown on the application detail page. In the example of FIG. 2, the system has personalized the high scores metric section for the present user by showing the user's high score within each of the three high scores category. For example, the system may normally present only the top 10 high scores earned by any user at any time, but when the system detects that the page has been requested by a user for whom there is user metrics data 180 associated with a high score, the system may personalize the page so that the user can compare his best score against that of others'.

In other embodiments, metrics data is personalized based on social data, such as data indicating a user's friends. Such data identifying a user's friends may be stored by the system or may be obtained from elsewhere, such as from a social networking website which the system is configured to interface with.

In the embodiment of FIG. 2, the system has detected it has access to user metric data for the present user's high score in Angry Squirrels. The system also presents the user with the ability to purchase Angry Squirrels to one of the user's mobile devices identified as "Tom's Work Cell." The system may present the user with this option because it detects that the user does not have Angry Squirrels on Tom's Work Cell, and may have instead obtained the high score on another mobile device associated with the user's account. In another embodiment, the system detects that a user previously had Angry Squirrels on the user's mobile device, but no longer has the application, and suggests the user to download the application again.

FIG. 2 shows a game-play metric 232 which indicates that the average time taken by a user to beat Angry Squirrels is 5.3 hours. This type of information may also affect a user's purchase decision because some users may seek games which provide an average playtime that the user views as sufficient to justify the game's price, and/or not so lengthy as to make completion of the game unrealistic. The system may present users with other metrics which may influence purchase decisions. Furthermore, the system may provide users with the ability to choose at least some of the metrics which they wish to view on product detail pages. For example, a user may indicate that she is particularly interested in the average time spent to beat a game, and a leaderboard tracking which users have earned the most achievements within a game, but is not interested in statistics concerning the average number of times per day that applications are launched. Such settings may be associated with a specific application, a category of applications, and/or all applications in the system. The system may personalize the presentation of metric data based in part on those user metric data settings.

The embodiment illustrated by FIG. 2 includes metric-based purchase recommendations 233. The system may provide the user with information indicating that certain other applications or application-related content may be of interest to the user, based at least in part on metric data associated with those other applications or application-related content. For example, the Angry Squirrels page is supplemented with information indicating that the most used downloadable content related to the Angry Squirrels application is the "Squirrels Map Pack 1" while the second most used downloadable content related to the Angry Squirrels application is the "Squirrels Antarctic Pack" 233. The system also presents the user with information indicating that the most used application which is related to Angry Squirrels is Angry Squirrels HD.

In one embodiment, the system determines what personalized content to display based on one application's degree of relation to a second application, as well as a metric (such a use). In another embodiment, metric data, such as the frequency with which a user uses a certain application, or the extent to which a user has completed playing a certain game, is considered by the system in determining how to personalize a page for a user. For example, the likelihood of the system recommending a game's sequel to a particular user may increase as the user gets closer to having completed the game. Alternately or additionally, once the user completes the game, the system may present the user with information based on that completion, such as suggesting: "Now that you've beaten Ping Pong Champ 5, why don't you get Ping Pong Champ 6?" It will be apparent that other adaptations on this type of metric-based personalization is included in the scope of the disclosure. For example, an application may be associated with a media item, such as a movie, television show or series, or book. The system may personalize content delivered to a user based on the extent to which the user has interacted with the existing media item application. Furthermore, personalization may include recommendations, search results, browsing, or other user-specific content.

In other embodiments, other personalization, such as personalized recommendations, are based at least in part on metric data. For example, the system may determine recommend a particular application to a user based on the user metric data concerning how frequently the user launches applications already on the user's device. The system may present users with personalized page content based on a combination of metric-based factors, purchase-based factors, social factors, and/or other considerations. Furthermore, the methods and systems described herein can also be applied to other sets of data than metric data based on use of mobile applications. For example, a system may capture sales based data which captures information, such as demographic information or information concerning the contents of a detail page, and aggregates and analyzes such information according to the methods and systems described herein.

Alternatively or additionally to using metric data, the system 104 may use point of sale data and/or demographic data in personalizing pages and producing reports. Point of sale data may include information concerning information presented to a user around the time of the user purchasing a mobile device application. For example, the system 104 may generate point of sale data reflective of a mobile application's sales and the amount of metric data displayed to users around the time said users' purchase said mobile application. The system 104 may then generate a report to a developer containing such data, and may also suggest that the developer provides additional metrics within the mobile application. Other examples of point of sale data are: information concerning the amount of description provided for a mobile device application, the number of screenshots, video captures, or other images and/or video associated with the mobile device application, and information concerning the times and/or days that users purchased the mobile device application.

Referring to FIG. 3, an embodiment is shown in which search results and application browsing is presented to a user based at least in part on metric data. The system may provide a user with the ability to search for mobile applications 310. The system may then present results relevant to the search term based at least in part on metrics gathered for the resulting applications. For example, in FIG. 3, the user has searched for "Simple Cooking Application.' The system presents the user with multiple results, with the result which is more according to use-based metrics 311 appearing ahead of the result which is less popular according to use-based metrics 312.

The system may also present the user with the ability to browse applications based at least in part on metric data 320. For example, the browsing interface shown in FIG. 3 allows a user to browse cooking application based on the number of recipes which they contain 321. Such information may be provided through a metric gathered during the application's operation on mobile devices. The browsing interface also allows the user to browse based on the frequency with which cooking applications are used 322. Other criteria for browsing, such as price, may be presented 323. Furthermore, information, such as browse ordering, may be presented to the user based on a combination of metric data and non-metric data. For example, the user may be presented with the ability to browse applications according to value, where value is determined based on use-based metrics, and price.

Figure 4:
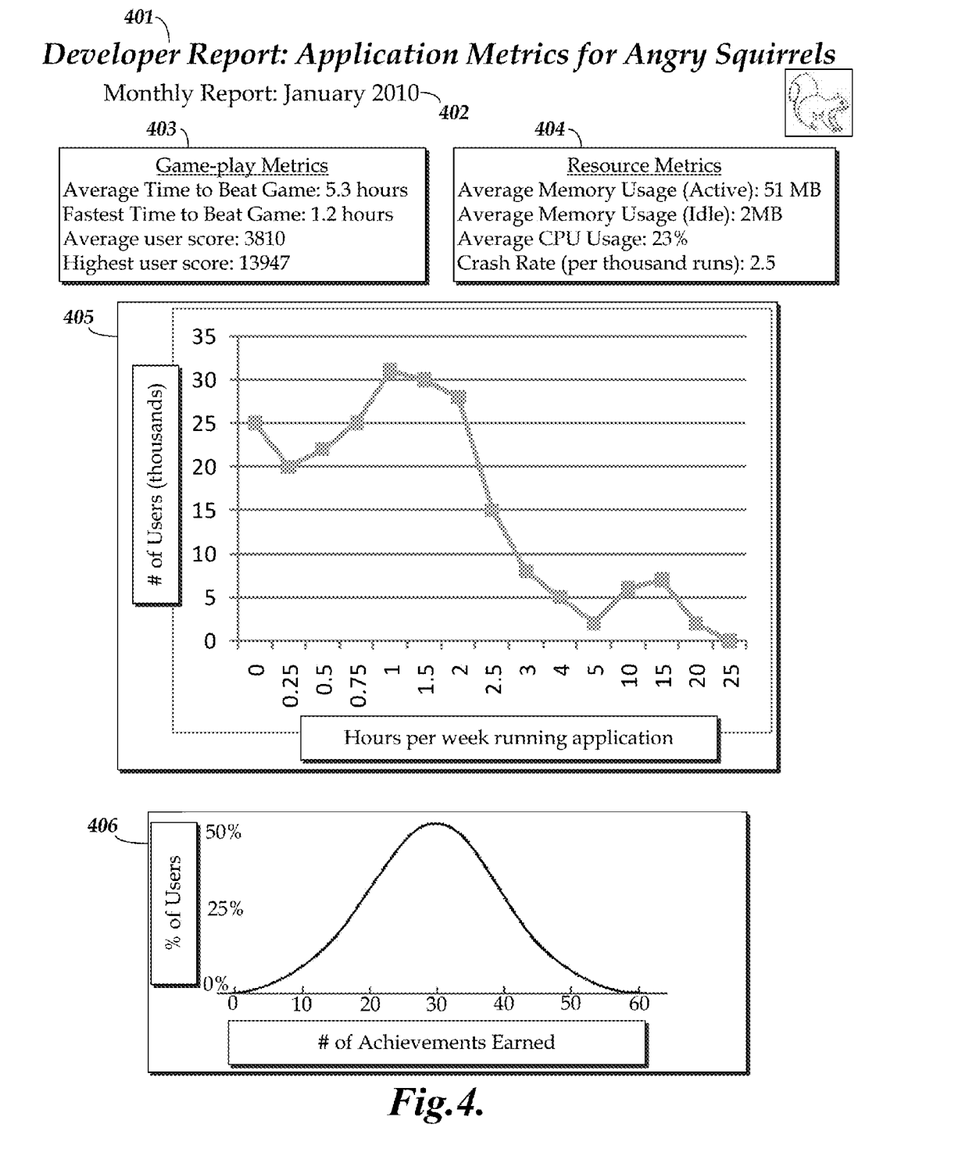
FIG. 4 shows one example of report created for an application developer, which includes analysis of aggregated metric data.

Referring to FIG. 4, an example of a report generated by the system 104 is shown. In this example, the report is a developer report 401 for the developer of Angry Squirrels, and presents application metrics based on the use of Angry Squirrels during January 2010. Reports, such as developer reports, may be based on specific time periods, or may cover the entire period during which a mobile application has been used. In other embodiments, the system 104 generates a report which contains information concerning multiple mobile device applications. In the example report shown in FIG. 4, the developer is presented with game-play metrics, including the average time which it takes users to beat the game, the fastest time in which a user has beaten the game, the average user score, and the highest user score 403. The system also includes information concerning resource metrics within the developer report 404. In this example, resource metrics include the average amount of memory used by the application while it is active, the average amount of memory used by the application while it is idle, the average percentage of a mobile device's central processing unit ("CPU") which the mobile application uses, and a crash rate for the mobile application, measured in number of crashes per thousand time the mobile application is run. The report may include information in any of a variety of formats, such as facts, statistics, charts, graphs, tables, descriptions, or other forms of presenting metric data. For example, in FIG. 4 two graphs present metric data: one illustrates the number of users of the application according to the amount of time which the users spend running the application 405. The other example graph illustrates the percentage of the application's users who have earned certain numbers of achievements in the application 406. Other metric-based information may be presented in reports.

Although the report shown in FIG. 4 was created by the system 104 in order to provide information which may be relevant to a developer, the system may also create reports for non-developers. In another embodiment the system 104 creates reports for application users. Such user-reports may include information from user metrics data 180 associated with the user. For example, the system may send a user a report describing the user's recent achievements, scores, and/or other metrics related to one or more applications which the user has operated on his mobile device. Such a report may also include information based on other users' metric data, for example so the user can compare his performance against averages, high-scores, his friends, or other users or groups of users. In another embodiment, the system presents an interface for anonymous research concerning user behavior, where the interface may allow researchers to analyze behavioral trends based on metrics data.

In some embodiments, the system 104 provides developers with recommendations based on analysis of the metrics data. For example, metric data may reveal that a significant portion of an application's users have nearly completed a game application and/or are beginning to use a particular application less often than they previously did. The system 104 may include a recommendation engine capable of generating recommendations based on metric analysis. In the provided example, the system 104 may generate a developer report which includes a recommendation to release additional application content. In one embodiment, the system 104 may create the developer report at least in part based on demographic information, which may be associated with user accounts. For example, the developer report may include information reflecting male users' use of the application as compared to female users' use of the application. In another example, the system may recommend that a developer increases marketing for his application which targets the Kentucky, because there is lower use of his application by users there than elsewhere.

Figure 5:
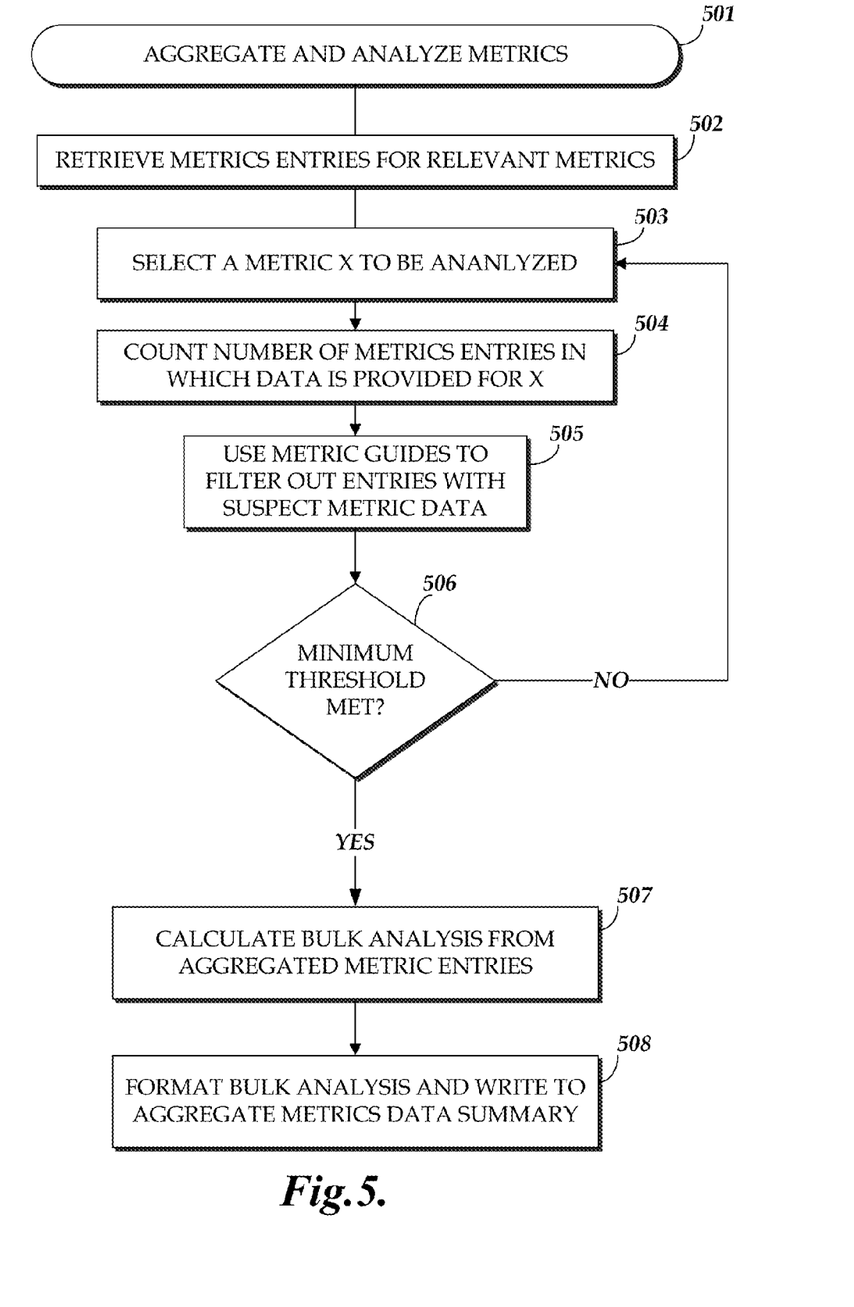
FIG. 5 depicts an illustrative metric aggregation and analysis method.

Referring to FIG. 5, an exemplary method is illustrated for aggregating and analyzing metrics 501. Metrics entries are retrieved for relevant metrics 502. A metric is selected to be analyzed 503. The number of metrics entries in which data is provided for the metric to be analyzed is counted 504. Metric guides may optionally be used to filter out entries with suspect metric data 505. For example, metric data which deviates significantly from other metric data and/or expected levels may be filtered. As an example, metric data indicating that a particular application has been run by a specific user for 82 years may be filtered. A high-score metric which exceeds the expected possible high score within a particular application may be filtered. Once filtered items have been removed, it is determined whether those metric entries which remain meet a certain minimum threshold 506. If there are insufficient metric entries for the current metric, a new metric may be selected for analysis. If there are sufficient metric entries for the current metric, there is a calculation of a bulk analysis from the aggregated metric entries 507. Such a calculation may include, as an example, any of the metric-based analyses described in this application. Alternatively or additionally, other analyses may be performed. The results of the bulk analysis are formatted and written to an aggregate metrics data summary 508. Optionally, and not shown in FIG. 5, reports may be generated from that aggregate metrics data summary.

Figure 6:
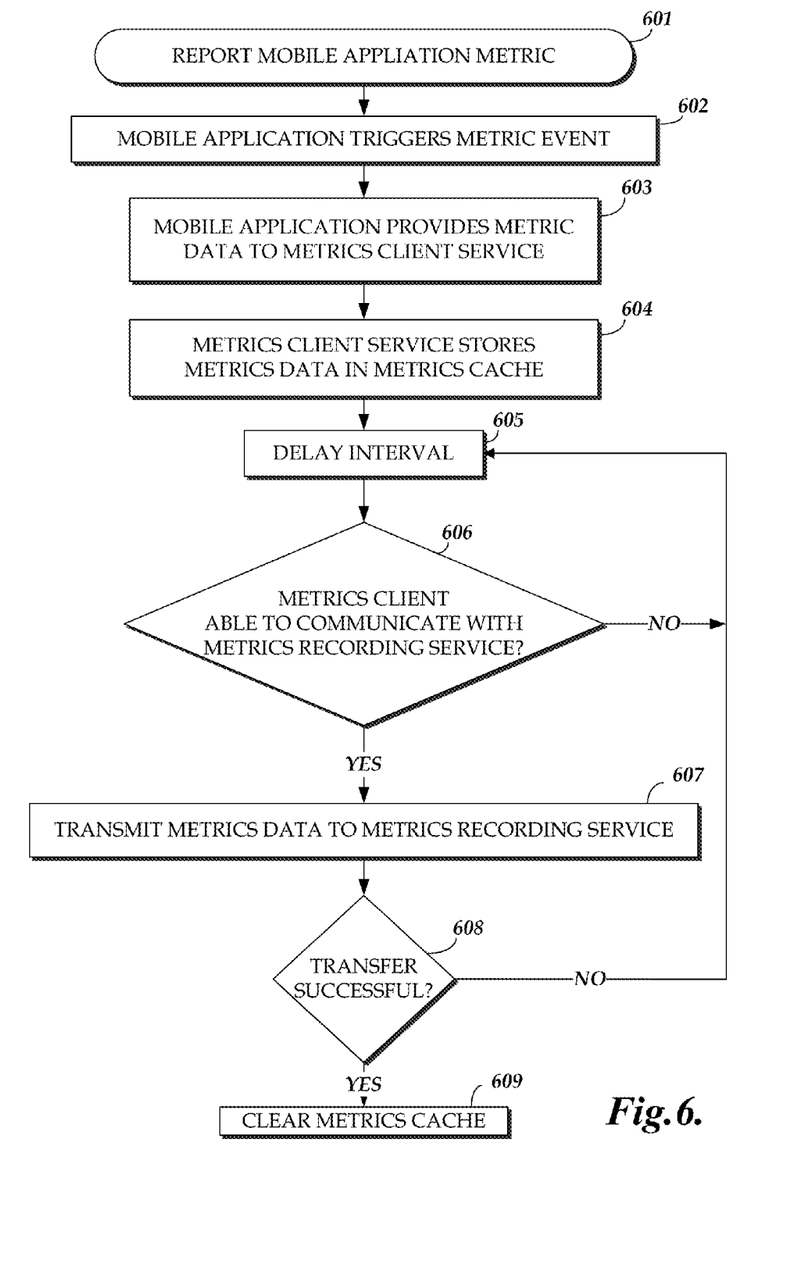
FIG. 6 depicts an illustrative method for reporting a mobile application's metrics to a metrics recording service, using a metrics cache on a mobile device.

Referring to FIG. 6, an exemplary method is illustrated for reporting mobile application metric data 601. A mobile application triggers a metric event 602. The mobile application provides metric data to a metrics client service 603. Such a metrics client service may function on the mobile device upon which the mobile application is functioning. The metrics client service stores metrics data in a metrics cache 604. There may then be an optional delay interval, which may be dynamic, static, and/or configurable. It is then determined whether the metrics client is able to communicate with the metrics recording service 606. For example, the metrics client may be located on a mobile device and the mobile device may not always have network connectivity, or may have limited connectivity at times. If the metrics client is not able to communicate with the metrics recording service, there may be another delay interval. If the metrics client is able to so communicate, there may be a transmission of metrics data to the metrics recording service 607. It is then determined whether that transfer was successful 608. If it was not successful, there may be another delay interval before a reattempt is made. For example, the user device may have lost network connectivity while attempting to transmit the metrics data. If the metrics data was transmitted successfully, the metrics cache may be cleared 608.

The network application system 104 may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 1, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

What is claimed is:

1. A method of providing information concerning use of a mobile device application, the method comprising:
   by a computer system that comprises one or more physical servers:
      providing user access to an electronic catalog, the electronic catalog providing functionality for identifying and downloading mobile device applications;
      receiving a submission of the mobile device application from a developer for incorporation into the electronic catalog;
      adding service code to the mobile device application received in the submission, the service code including functionality to report usage metric data, wherein adding the service code comprises identifying a predefined function of the mobile device application, and adding service code that causes execution of the predefined function to be reported in the usage metric data;
      distributing the mobile device application with the service code to mobile devices;
      receiving, from the mobile devices, usage metric data quantifying use of the mobile device application by the mobile, devices, the usage metric data generated by the mobile devices through measuring activity related to the use of the mobile device application, the usage metric data reported by the mobile devices by execution of the service code by the mobile devices;
      aggregating the usage metric data to produce aggregated metric data;
      based on the aggregated metric data, and additional aggregated metric data collected for other mobile device applications, determining a ranking of the mobile device application in terms of at least one of (1) average number of times launched, and (2) average amount of time spent using the mobile device application; and
      incorporating an indication of the ranking into a catalog page associated with the mobile device application, to thereby expose the ranking to users of the electronic catalog.

2. The method of claim 1, wherein the ranking is in terms of average number of times launched.

3. The method of claim 1, wherein the ranking is in terms of average amount of time spent using the mobile device application.

4. The method of claim 1, wherein the mobile device application is a mobile device game application and the ranking is specific to game applications.

5. The method of claim 1, wherein determining the ranking comprises (1) determining a first ranking of the mobile device application in terms of average number of times launched, and (2) determining a second ranking of the mobile device application in terms of average amount of time spent using the mobile device application.

6. A system capable of providing a user with information concerning mobile device application usage, the system comprising:
   a catalog system configured to provide user access to an electronic catalog, the electronic catalog providing functionality for identifying and downloading mobile device applications;
   an application submission processing system configured to receive a developer submission of a mobile device application for inclusion in the electronic catalog, and to add service code to a predefined function of the mobile device application, the service code including functionality to report usage metric data that includes usage of the predefined function;
   a recording system configured to receive, from mobile devices, usage metric data reported by the mobile devices by execution of the service code, the usage metric data quantifying use of the mobile device application, the usage metric data generated on the mobile devices through measuring activity related to mobile device application use; and
   an aggregation and analysis system configured to aggregate the usage metric data to produce aggregated metric data, and to determine, based on the aggregated metric data and additional usage metric data collected for other mobile device applications, a ranking of the mobile device application relative to the other mobile device applications;

the catalog system configured to incorporate an indication of the ranking into an electronic catalog page associated with the mobile device application, such that the ranking is exposed to users of the electronic catalog;

said system comprising one or more physical servers.

7. The system of claim 6, wherein the mobile device application is a mobile device game application and the ranking is specific to game applications.

8. The system of claim 6, wherein the ranking is based on average number of times launched.

9. The system of claim 6, wherein the ranking is based on average amount of time used.

10. The system of claim 6, wherein the aggregation and analysis system is configured to generate a first ranking of the mobile device application based on average number of times launched, and to generate a second ranking of the mobile device application based on average amount of time used, wherein the catalog system is configured to incorporate indications of the first and second rankings into the electronic catalog page.

11. Non-transitory computer storage having stored thereon executable program code that directs a computing system comprising one or more computers to perform a process that comprises:

providing user access to an electronic catalog, the electronic catalog providing functionality for identifying and downloading mobile device applications;

receiving a submission of a mobile device application from a developer for incorporation into the electronic catalog;

adding service code to a predefined function of the mobile device application received in the submission, the service code including functionality to report usage metric data that includes execution of the predefined function;

distributing the mobile application with the service code to mobile devices;

receiving, from each of a plurality of the mobile devices, usage metric data quantifying use of the mobile device application on that mobile device, the usage metric data generated on the mobile devices by monitoring use of the mobile device application and reported by execution of the service code by the mobile devices;

aggregating the usage metric data, and additional usage metric data associated with other mobile devices applications, to produce aggregated metric data;

determining a ranking of the mobile device application, relative to the other mobile device applications, based at least partly on the aggregated metric data; and incorporating an indication of the ranking into an electronic catalog page associated with the mobile device application, thereby exposing the ranking to users of the electronic catalog.

12. The non-transitory computer storage of claim 11, wherein the ranking is based on average number of times launched.

13. The non-transitory computer storage of claim 11, wherein the ranking is based on average amount of time used.

14. The non-transitory computer storage of claim 13, further comprising determining a second ranking of the mobile device application based on average number of times launched, and incorporating an indication of the second ranking into the electronic catalog page.

15. The non-transitory computer storage of claim 11, wherein the ranking is specific to a particular mobile device application category.

* * * * *

UNITED STATES PATENT AND TRADEMARK OFFICE
CERTIFICATE OF CORRECTION

PATENT NO. : 9,460,461 B1
APPLICATION NO. : 13/044475
DATED : October 4, 2016
INVENTOR(S) : Sunbir Gill et al.

Page 1 of 1

It is certified that error appears in the above-identified patent and that said Letters Patent is hereby corrected as shown below:

In the Specification

In Column 6 at Line 42, change "onDestropy( )" to --onDestroy( ).--.

In the Claims

In Column 14 at Line 10, change "mobile," to --mobile--.

Signed and Sealed this
Twenty-seventh Day of March, 2018

Andrei Iancu
*Director of the United States Patent and Trademark Office*